March 8, 1949.                 G. K. DICKERMAN                  2,463,856
                         PRODUCTION OF LAMINATED PLASTIC
Filed March 22, 1943                                      3 Sheets-Sheet 1
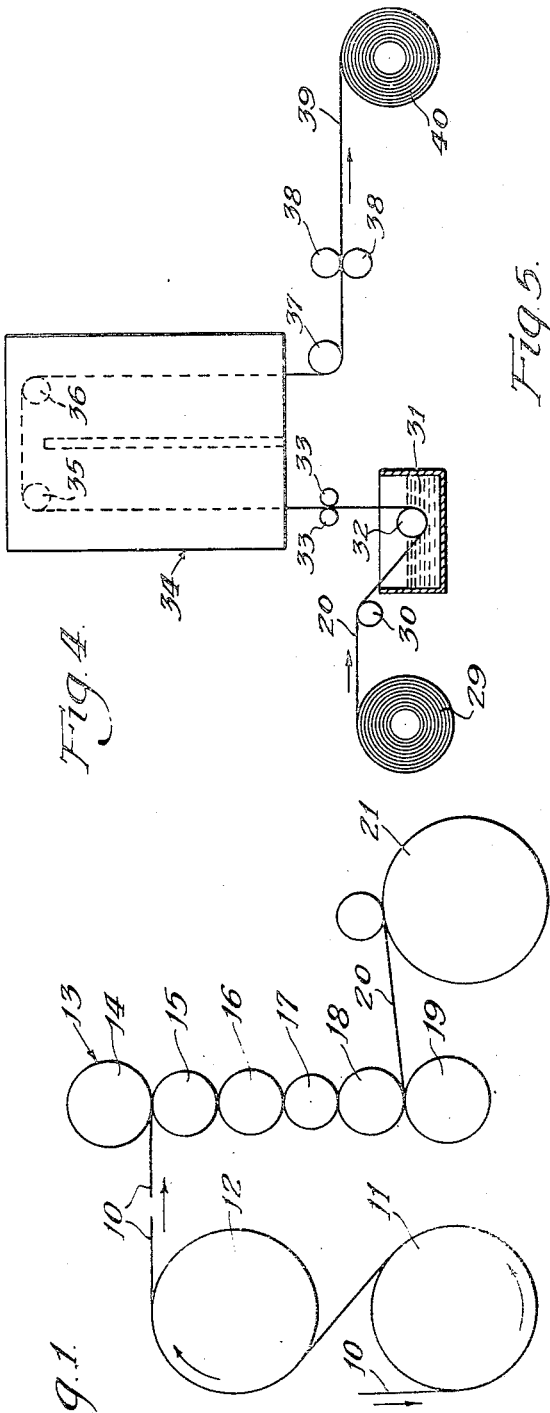
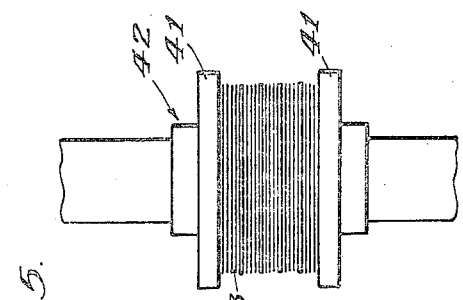
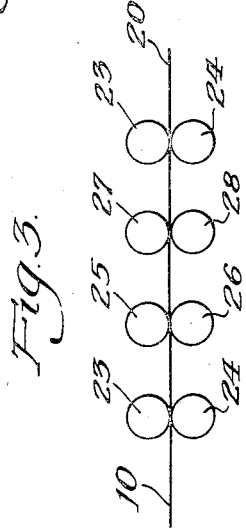
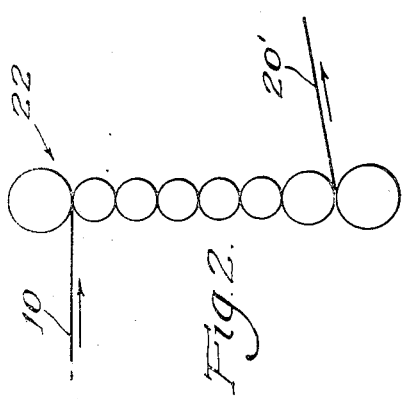
Inventor:
Gilbert K. Dickerman
By: Lee J. Gary
         Attorney March 8, 1949.  G. K. DICKERMAN  2,463,856

PRODUCTION OF LAMINATED PLASTIC

Filed March 22, 1943  3 Sheets-Sheet 2

LEGEND:
REGULAR PAPER ———
DENSIFIED PAPER — — — —

Inventor:
Gilbert K. Dickerman
By: Lee J. Gary
Attorney

March 8, 1949.   G. K. DICKERMAN   2,463,856
PRODUCTION OF LAMINATED PLASTIC
Filed March 22, 1943   3 Sheets-Sheet 3

Inventor:
Gilbert K. Dickerman
By: Lee J. Gary
Attorney.

Patented Mar. 8, 1949

2,463,856

UNITED STATES PATENT OFFICE 2,463,856

PRODUCTION OF LAMINATED PLASTIC

Gilbert K. Dickerman, Wisconsin Rapids, Wis., assignor to Consolidated Water Power and Paper Company, Wisconsin Rapids, Wis., a corporation of Wisconsin Application March 22, 1943, Serial No. 480,057

3 Claims. (Cl. 154—138)

This invention relates to the production of laminated plastic suitable for use as a substitute for metals and other materials, and more specifically to an improved method for forming heat curable resin impregnated sheet material and to the production therefrom of high strength laminated plastic.

It is an object of the present invention to enable the production of laminated paper base plastic having about the same specific strength as aluminum with only about one-half its density and which is exceptionally well adapted for use in aircraft manufacture, particularly stressed aircraft parts. More particularly it is an object of the present invention to provide an improved process which permits the production of such plastic material at relatively low molding pressures and with less than heretofore conventional resin content and the attainment of high densities, high tensile strength and low water absorption quality at relatively low molding pressures, to a degree heretofore obtainable only with much higher molding pressures, all with greater economy of component materials, equipment, operation costs and other attendant advantages.

Thus for example the process of the present invention enables the laminating consolidation step to be carried out at a molding pressure of about 75 pounds per square inch, and to obtain at such pressure a product having the same tensile strength, density and water absorption characteristic as one heretofore composed of the same paper reinforcement and resin bonding agent and molded at a pressure of about 250 pounds per square inch, while at the same time effecting an economy in the amount of resin by about 15%, more or less. Similarly, by the present process there may be accomplished at a molding pressure of about 250 pounds per square inch what has heretofore required about 500 pounds per square inch. The attendant advantage in the ability to utilize more economical and more readily available molding presses by reason of low pressure requirement is in itself obviously of a tremendous advantage, which is further enhanced by the saving in resin requirement.

The foregoing general advantages may be obtained in accordance with the present invention by subjecting a sheet of dry paper to densification by means of rolling pressure prior to impregnation thereof with a solution of the resin impregnant, so as to reduce the voids content thereof, but which does not appreciably affect its absorption qualities, to the end that resistance to compression in the final laminating and consolidating step is materially lessened, allowing the use of lowered resin content and much lower molding pressure in obtaining a product of low final voids, that is less than 10%, and preferably less than 6% voids for products having a specific gravity of about 1.35 to about 1.40, tensile strengths in excess of 40,000 pounds per square inch and a 24 hour water absorption characteristic below about 5%.

In the formation of laminated resin impregnated paper plastics, the fibre of the paper acts as the reinforcement medium and as such a maximum amount thereof is desirable, the resin being the bonding and waterproofing agent, and while for such purpose an optimum amount is necessary, a more economical balance may be obtained in accordance with the present process. In forming the laminate the resin is substantially incompressible and the voids in the compressible paper phase are determined chiefly by the resistance to compression of the treated paper. Such resistance is lessened by the plasticizing effect of the resin but normally is still sufficient to prevent obtaining low voids such as below about 6% for best physical properties, below certain resin contents and molding pressures. However, by pre-compressing or densifying the sheet material in accorddance with the present invention, as more fully set forth hereinafter, and as illustrated by the accompanying diagrammatic drawings, such resistance to compression may be greatly reduced allowing the use of lower resin content and much lower molding pressure in obtaining a product of low voids.

Fig. 1 is a diagrammatic illustration of a supercalender preferably employed in accordance with the present invention for densification of the paper, at the "dry" end of a paper making machine.

Fig. 2 diagrammatically illustrates a calender which may be employed in the present process for densification of the paper prior to impregnation thereof.

Fig. 3 diagrammatically illustrates a series of horizontally arranged pairs of rollers, which may be employed for the densification of the paper prior to impregnation treatment thereof.

Fig. 4 diagrammatically illustrates an arrangement of apparatus which may be employed for the impregnation of the densified paper.

Fig. 5 diagrammatically illustrates a flat press which may be used for laminating sheets of the impregnated paper.

Figure 6:
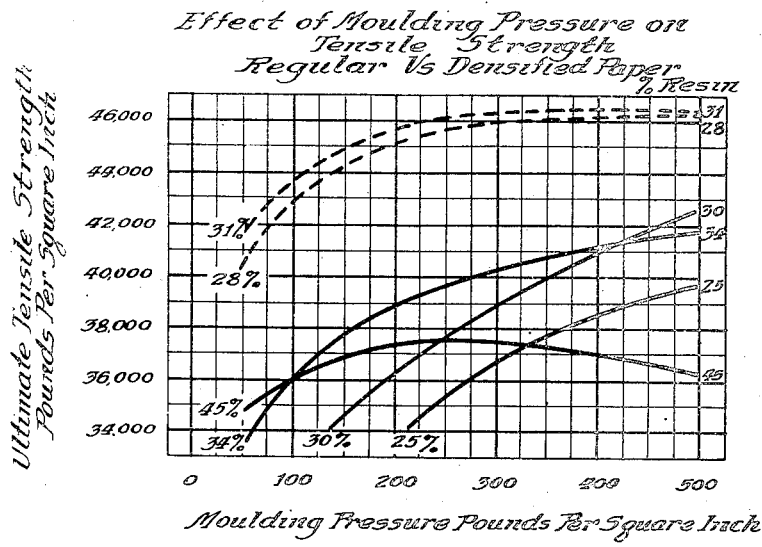
Fig. 6 is a graph illustrating the effect of molding pressure on tensile strength of densified paper as compared with undensified paper.

Referring to the drawings, Fig. 1 illustrates a sheet of paper 10 passing around the final drying cylinders 11 and 12 at the dry end of a paper making machine. This paper may then be wound up on reels and subsequently fed therefrom to a super-calender generally indicated as 13 for densifying the sheet, or fed thereto in a continuous operation.

The present process may be employed with equal or related effect in the formation of laminated sheet material suitable for various purposes, and composed of various fibrous materials, with the end in view of obtaining good tensile strength at a lower molding pressure than that required to obtain equal or related strength quality in the undensified material at higher pressures, and with a greater economy of heat curable binder. However, for the purpose of producing laminated paper base plastic having about the same specific strength as aluminum with only about one-half the density thereof, so as to adapt the laminated material to be useful in the manufacture of stressed aircraft parts and the like structures requiring high tensile strengths, there is preferably employed an "aircraft paper" which has been found to give the strongest plastics. Such desirable "aircraft paper" may be obtained by the use of an unbleached sulfite pulp, prepared from wood fibers such as white spruce, Engelmann's spruce or black spruce, and preferably the latter when prepared by what is called the Mitscherlich process to provide a commercial Mitscherlich sulfite pulp. The advantage of such process is that it produces a strong fiber and high yield because of the comparatively weak acid and low temperature of cooking characteristic of the process, and by preferably employing black spruce, the fiber strength is further enhanced. Further processing of the pulp is in accordance with conventional paper making technique, the sheeting being carried out with a relatively dilute pulp so as to achieve a directionalizing effect and to produce a paper having a thickness of from about .002 to about .004 inch, after which the paper is dried in conventional manner. The foregoing steps should be conducted with the further end in view of producing a sheet of good absorbency or porosity for the purpose of obtaining complete and rapid penetration of the resin in the subsequent impregnation step.

An average sheet of paper of desirable "aircraft" quality produced in accordance with the hereinbefore indicated preferred process will have an average thickness of .003 inch, and based on the known weight of this paper and the knowledge of the specific gravity of 1.50 of the component pulp the voids of such average sheet may be calculated at about 55% by volume. The foregoing paper will be considered in the further description of the present process for the purpose of uniformity and better comparison, but not as a limitation of the present invention.

As illustrated in Fig. 1, the sheet after leaving the drying cylinders is thereafter subjected to densification by means of the supercalender 13 which for the purpose of illustration has been shown to be composed of six rolls indicated as 14, 15, 16, 17, 18 and 19, and the rolls designated as 19, 17 and 14 may be understood to be provided with highly finished hardened surfaces while the other rolls, 18, 16 and 15, have resilient highly finished surfaces of a fibrous material such as paper, cotton, etc. As the sheet passes between the successive nips of the rollers it is subjected to densification by means of the rolling pressure, and with the use of a supercalender, as is conventional, there is a combined frictional and flexure effect caused by indentation of a metal into a fiber roll, and as the paper emerges from between the last nip of the rolls 18 and 19 it is in the form of a densified sheet 20. The undensified sheet which thus entered the supercalender at a thickness of .003 inch, may be reduced to a thickness of about .0023 inch with a reduction in calculated voids of from about 55% to 42%, after which sheet 20 may be wound upon the reel 21 for subsequent impregnation treatment.

Fig. 2 illustrates the use of a conventional calender generally indicated as 22 which may be employed for densifying the sheet material 10, the sheet passing successively between a stack of superimposed rolls all of which are provided with relatively hard metallic surfaces such as chilled iron, steel, etc., the densified sheet emerging between the nip of the two lowermost rolls as a densified sheet 20'.

In a similar manner there may be employed a plurality of horizontally arranged pairs of rolls as illustrated in Fig. 3 for densification of the sheet 10 as it leaves the dryer to the paper machine. These rolls may comprise one or more pairs of pressure rolls 23, 24, both of which may be provided with relatively hard metallic surfaces, or there may be employed an arrangement to provide an effect similar to that of supercalendering, that is, some of these roll pairs may consist of either an upper fibrous roll 25 and a lower hard surface roll 26, and there may be conveniently included in the series a similar arrangement of another pair wherein the upper roll 27 is of a fibrous nature and the lower roll 28 is hard surfaced so as to provide a simulated indentation and flexure effect together with some frictional effects inherent in a supercalender. It will be understood that the arrangement of rolls shown in Fig. 3 is purely diagrammatic and various similar combinations will be evident to those skilled in the art, the paper emerging from between the rolls as the densified sheet 20''.

The advantage of rolling pressure vs. flat pressure can best be illustrated by the comparison of the pressures involved. Thus a normal nip pressure at the bottom of a calender such as that of Fig. 2, as found in conventional paper calenders, may be 1,000 pounds per linear inch. This gives a nip of about ⅛ inch or an effective pressure of 8,000 pounds per square inch between the two lowermost rolls of the stack. The effect of this pressure in densifying the sheet is enhanced by the use of a supercalender such as that of Fig. 1 by the flexing of the paper by indentation of the metal into the fiber roll, and the frictional effects inherent in supercalendering. Similar effects and advantages can be obtained by the use of an arrangement of the apparatus shown in Fig. 3, although not with equal effect or as conveniently obtainable by concentrated pressures and simpler controls available in a vertical stack, but all of the foregoing means afford rolling pressure to enable the sheet to be densified in a simple manner and with much greater economy than can possibly obtain by the use of the enormous installations that would be necessary to obtain the pressure in a flat press, and without equivalent result, and particularly that obtained by flexing and the progressive densification effect in the direction of the fibers on the moving sheet as it passes between the nips of the rollers, which also appears to provide a better fiber interfelting or interlocking arrangement and the substantial maintenance of such compaction or densification while passing through the subsequent impregnation step in a manner not obtainable by the use of a flat press even though equal pressures are employed. Reduction in the thickness by means of rolling pressure densification in accordance with the present invention is preferably conducted so as to obtain a reduction in thickness of the sheet from about 10 to about 25% and a reduction of the initial voids content of from 15 to about 30%.

The densified paper is thereafter combined, as the reinforcing agent or filler, with resin as the bonding and waterproofing agent by impregnation, for the purpose of preparing the material for the subsequent laminating and consolidating operation. The impregnation consists of passing the paper through a varnish or solution of a thermosetting resin, preferably a phenol aldehyde product of the Bakelite type in an alcoholic solvent, a preferable concentration of the solution as used in accordance with the present operation being a solids content of about 55%, the varnish at this stage having a specific gravity of about 1.07, the solid resin used for the purpose of the indicated comparisons having a specific gravity of about 1.27 after complete evaporation of the solvent and completion of the cure.

The densified sheet of paper 20 may be unwound from a roll 29 similar to that of the roll 21, and passed horizontally over a direction change roll 30 and submerged in the impregnating solution 31 under a roll 32, which also changes the direction of the paper so that the paper moves vertically upwards through a pair of squeeze rolls 33 and into the drying tunnel generally indicated as 34. Here it passes over the rolls 35 and 36 and descends vertically of the drying tunnel and under a roll 37 which permits the paper to be pulled away from the machine by passing through a pair of rubber squeeze rolls 38 which act as drive rolls for pulling the paper through the machine, to emerge as the impregnated paper 39 containing the resin in a partially cured form or in the "B" stage, after which it may be wound up on the reel 40. Passage of the paper through the impregnating solution is relatively rapid, the period of dwell in the solution 31 being about 2 seconds or less, although sufficient for thorough saturation and penetration. Additional control of the amount of incorporated resin solution is provided by means of the squeeze rolls 33 and temperature and viscosity of the solution, the operation being preferably conducted so as to incorporate slightly more than the calculated incorporatable amount by providing a surface coating.

When impregnating an undensified sheet of material of the kind hereinbefore described having about a 55% voids content, complete impregnation with a resin varnish of 55% solids by weight, would upon evaporation of the solvent leave a resin content in the impregnated sheet of 33% by weight thereof. A similar calculation of the densified sheet gives a resin content of about 27% for a fully impregnated densified sheet.

As indicated previously, however, actually a slight excess of resin content is and can be used since it is desirable to have a small excess of resin on the surface of the sheet, and also some swelling of the sheet occurs as it goes through the varnish bath which increases the voids to some extent. In general the present operations have indicated an optimum resin content of about 35% for the normal sheet and about 30% for the densified sheet.

After the impregnated paper leaves the squeeze rolls 33, which doctor off the surface resin and tend to control the resin content of the paper, although the control is primarily by the properties of the impregnating solution such as the nature of the resin, concentration and viscosity of the solution, etc., as well known in the art, the wet saturated paper is subjected to drying in the dryer 34. This dryer comprises preferably at least two zones, the paper in its upward passage passing through one zone heated to a temperature of about 230° F. and in its downward vertical run passing through a zone heated to a temperature of about 300° F., the first heating stage being primarily one of removal of the solvent and a heating of the resin to the tacky stage and the second the heating being essentially the polymerization or partial cure of the resin to the "B" stage, the volatile content of the sheet 39 as it emerges being from about 4 to about 8%, and preferably from about 4 to about 5%. The passage of the paper through the dryer is accompanied by circulation of air to remove the solvent from the resin and other gases and vapors from the tunnel by means not illustrated, the time of passage through the drying and heating tunnel being about one minute.

The last step in the process comprises the lamination of a plurality of the impregnated and partially cured sheets, and curing the resin to infusibility under a consolidating pressure and resin curing temperature. This may be accomplished by subjecting a plurality of superimposed sheets 43 to pressure, for example between the heated platens 41 of the flat press 42 when it is desired to form sheets of flat laminated material. The temperature of cure is generally about 300° F. and the time of cure being about 2 to about 20 minutes, depending upon the resin, condition of cure and hardening agents used, etc.

With the amount of resin incorporated in the sheet so as to provide a residual resin content of about 28% by weight, the present process enables the production of a cured sheet having a specific gravity of 1.33 and a tensile strength of about 40,000 pounds per square inch at a molding pressure of as low as 50 pounds per square inch, and with pressures as low as 75 pounds per square inch, the laminated product may have a specific gravity of about 1.35 and a tensile strength of approximately 42,000 pounds per square inch, with a modulus of elasticity in excess of 3,000,000 pounds per square inch, and a 24 hour absorption water characteristic as low as 4%.

It will be understood that the flat press illustrated in Fig. 5 is purely diagrammatic and that the lamination can be conducted or products satisfactorily molded in any desired shape or contour including curved, or in double curvature forms of large radius without special treatment.

Figure 7:
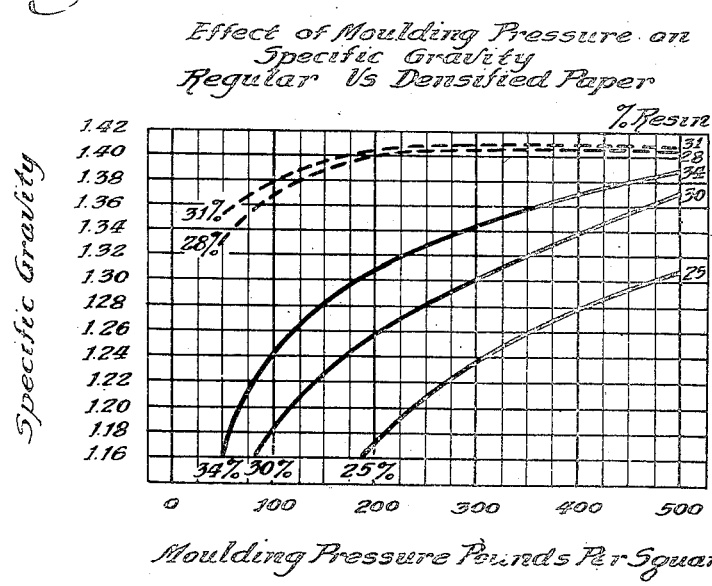
Fig. 7 is a graph illustrating the effect of molding pressure on specific gravity of densified paper as compared with undensified paper.
Figure 8:
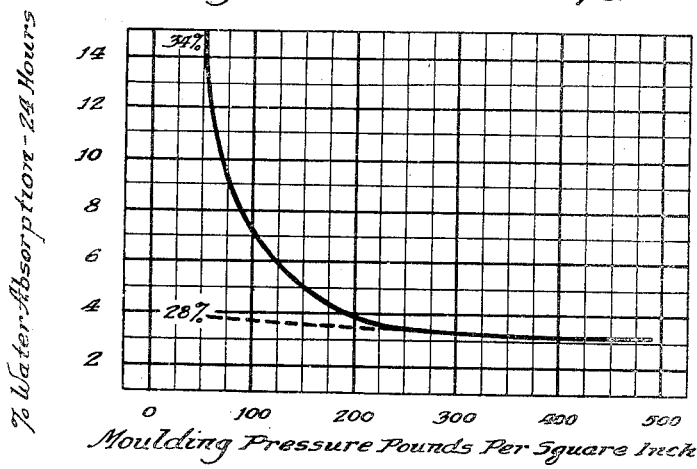
Fig. 8 is a graph illustrating the effect of molding pressure on water absorption on densified paper as compared with undensified paper.

The graphs of Figs. 6, 7 and 8 illustrate the effect of molding pressure on ultimate tensile strength, specific gravity and water absorption respectively for the purpose of comparison of laminates formed from regular paper as opposed to paper which has been densified prior to impregnation as in the present invention, the curves for regular paper being indicated by full lines and those for densified paper being indicated by dotted lines. It will likewise be understood as previously indicated that for the purpose of such better comparison, the original paper utilized in each instance is of the same nature, that is, an "airplane" paper base composed of the strong spruce, Mitscherlich sulfite pulp, the pulp having a specific gravity of about 1.50, the sheet having an average thickness of .003 after leaving the dry end of the paper machine, with a voids content of approximately 55%. The resin in each instance was a phenol formaldehyde resin of the Bakelite type having a specific gravity of about 1.27. The densified paper in each instance was originally of the same nature as the undensified paper, but prior to impregnation had been subjected to densification by the rolling pressure of a supercalender and reduced to a thickness of .0023 inch and the voids content reduced to about 42%. For the regular paper having a resin content of 34% and for the pre-densified paper having a resin content of 28%, the impregnating solution and controls were identical, that is, the resin solution had a 55% solids content with other controls such as temperature, viscosity, doctoring, etc., substantially the same so as to permit the respective sheets to become saturated or impregnated with the resin solution to about their normal capacities. In plotting the other curves, although the same regular and densified paper was respectively used, the impregnation controls were regulated so as to cause the incorporation in the sheets of the respectively designated percentages of resin. The sheets were parallel laminated, and the noted tensile strengths taken in the direction of the grain.

Fig. 6 illustrates that at a molding pressure of about 250 pounds per square inch with a regular sheet, the best tensile strengths were obtained with a resin content of about 34%, this graph further illustrating that at molding pressures of about 500 pounds per square inch, a regular sheet having a resin content of about 30% begins to show equivalent or better tensile properties than the 34% resin content sheet, but that reducing the resin content to 25% does not give improved, but rather poorer results even at a pressure of 500 pounds per square inch. On the other hand, incorporation of a higher percent of resin such as 45% shows a falling off in tensile strength at pressures greater than 250 pounds per square inch.

As distinguished from the use of such regular papers, it will be observed that with the use of the densified paper in accordance with the process of the present invention, having a residual resin content of about 28% by weight, a tensile strength of about 40,000 pounds per square inch may be obtained with a molding pressure as low as 50 pounds per square inch. Such tensile strength is substantially equal to that obtainable at a molding pressure of 250 pounds per square inch with the regular sheet of about 34% resin content, the latter having the optimum strength qualities at such molding pressure. It will be further observed that at a molding pressure of about 100 pounds per square inch the densified paper of 28% resin content had a tensile strength substantially equal to or in excess of the tensile strength obtainable at a molding pressure of about 500 pounds per square inch with regular paper having a resin content of either 30 or 34%, and that at a molding pressure of about 250 pounds per square inch the densified paper exhibited an ultimate tensile strength of approximately 45,000 pounds per square inch or better.

The rather remarkable increase in strength obtained at molding pressures in the range of 200 to 500 pounds per square inch, with the use of pre-densified paper is clearly indicated on graph 6, such high values being typical and consistently obtainable, and values as high as 48,000 pounds per square inch having been obtained, as distinguished from this, use of the regular paper seldom produces strengths over 40,000 pounds per square inch.

Reference to the graph of Fig. 7 will indicate that a molding pressure as low as about 50 pounds per square inch on the 28% resin content pre-densified sheet provides a product of a specific gravity of about 1.33 which is far in excess of the specific gravity obtainable when using regular paper at like pressure, and substantially equal to that of the regular paper having a 34% resin content when molded at a pressure of about 250 pounds per square inch. It will also be seen that on the regular paper compression falls off badly as resin content or molding pressure is lowered. It will also be apparent that the curves of Fig. 7 bear a relationship to those of Fig. 6, and also to those of Fig. 8, the latter showing the effect of molding pressure on water absorption.

Figure 9:
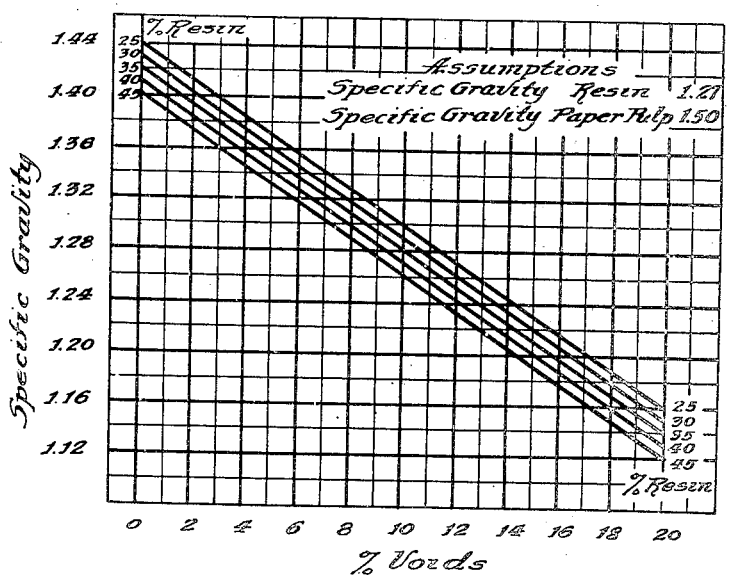
Fig. 9 is a graph illustrating the relationship between specific gravity to percentage of voids in sheets of various percentages of resin content.

By referring to Fig. 9 showing the straight line relationship between the specific gravity and percentage of voids for sheets of various resin contents, it will be apparent that the specific gravity, ultimate tensile strength, and water absorption of the final product bears a definite relationship to the final voids content, and that the products having the best properties are those of the lowest void content, generally below 10% voids, and preferably below 6% voids. With high voids most of the critical physical properties such as tensile strength and water absorption are poor.

From the foregoing it will be evident that in accordance with the present invention laminated paper base plastics of low voids and consequently of high tensile strength, high density, and low water absorption, may be produced containing a maximum amount of fiber reinforcement and a minimum amount of bonding and waterproofing agent, the laminate being capable of being consolidated to provide these desirable qualities at much lower molding pressures than is required to produce a product of similar physical characteristics when employing greater amounts of heat curable binder and a normal paper base, with obvious economies. As an example of other advantages, it will be apparent that laminates of paper base plastic produced in accordance with the present invention may be readily consolidated with plies of wood veneer or greater thicknesses of various woods at relatively low molding pressures so as to prevent crushing or damage to the wood while at the same time bringing out substantially the maximum physical properties obtainable in the paper plastic plies.

I claim as my invention:

1. A method of forming a high strength compactly bonded laminated paper base plastic which comprises super-calendering a relatively thin, porous, absorbent sheet of Mitscherlich sulfite paper to densify the same and to reduce its voids content, impregnating said super-calendered paper with a phenolic resin in an alcoholic solution to provide therein a resin content of about 26–32% of the weight of dry paper, and subjecting a plurality of plies of said impregnated paper to heat and pressure of not in excess of about 250 pounds per square inch to cure said resin whereby to reduce the voids content of the mass to less than about 6%.

2. A method of forming a high strength compactly bonded laminated paper base plastic which comprises super-calendering a relatively thin, porous, absorbent sheet of Mitscherlich sulfite paper to densify the same and to reduce its voids content, impregnating said super-calendered paper with a phenolic resin in an alcoholic solution to provide therein a resin content of about 26–32% of the weight of dry paper, and subjecting a plurality of plies of said impregnated paper to heat and pressure of not in excess of about 150 pounds per square inch to cure said resin whereby to reduce the voids content of the mass to less than about 10%.

3. A method of forming a high strength compactly bonded laminated paper base plastic which comprises super-calendering a relatively thin, porous, absorbent sheet of Mitscherlich sulfite paper to densify the same and to reduce its voids content, impregnating said supercalendered paper with a phenolic resin in an alcoholic solution to provide therein a resin content of about 26–32% of the weight of dry paper, and subjecting a plurality of plies of said impregnated paper to heat and pressure of not in excess of between about 50 and 100 pounds per square inch to cure said resin whereby to reduce the voids content of the mass to less than about 6%.

GILBERT K. DICKERMAN.

REFERENCES CITED

The following references are of record in the file of this patent:

UNITED STATES PATENTS

| Number | Name | Date |
| --- | --- | --- |
| 744,422 | Smith | Nov. 17, 1903 |
| 1,019,406 | Baekeland | Mar. 5, 1912 |
| 1,284,296 | Frederick | Nov. 12, 1918 |
| 1,318,742 | Frederick | Oct. 14, 1919 |
| 1,441,133 | Taylor | Jan. 2, 1923 |
| 1,685,355 | Ellis | Sept. 25, 1928 |
| 2,054,444 | Pinten | Sept. 15, 1936 |
| 2,092,502 | Ellis | Sept. 7, 1937 |
| 2,292,118 | Guhl | Aug. 4, 1942 |

FOREIGN PATENTS

| Number | Country | Date |
| --- | --- | --- |
| 115,402 | Australia | Sept. 26, 1941 |

OTHER REFERENCES

"High Strength Phenolic Paper Laminates," by G. K. Dickerman, from Paper Trade Journal, June 29, 1944, vol. 118, No. 26.